T. L. FAWICK.
POWER TRANSMISSION DEVICE.
APPLICATION FILED JAN. 25, 1915.
1,169,072.
Patented Jan. 18, 1916.
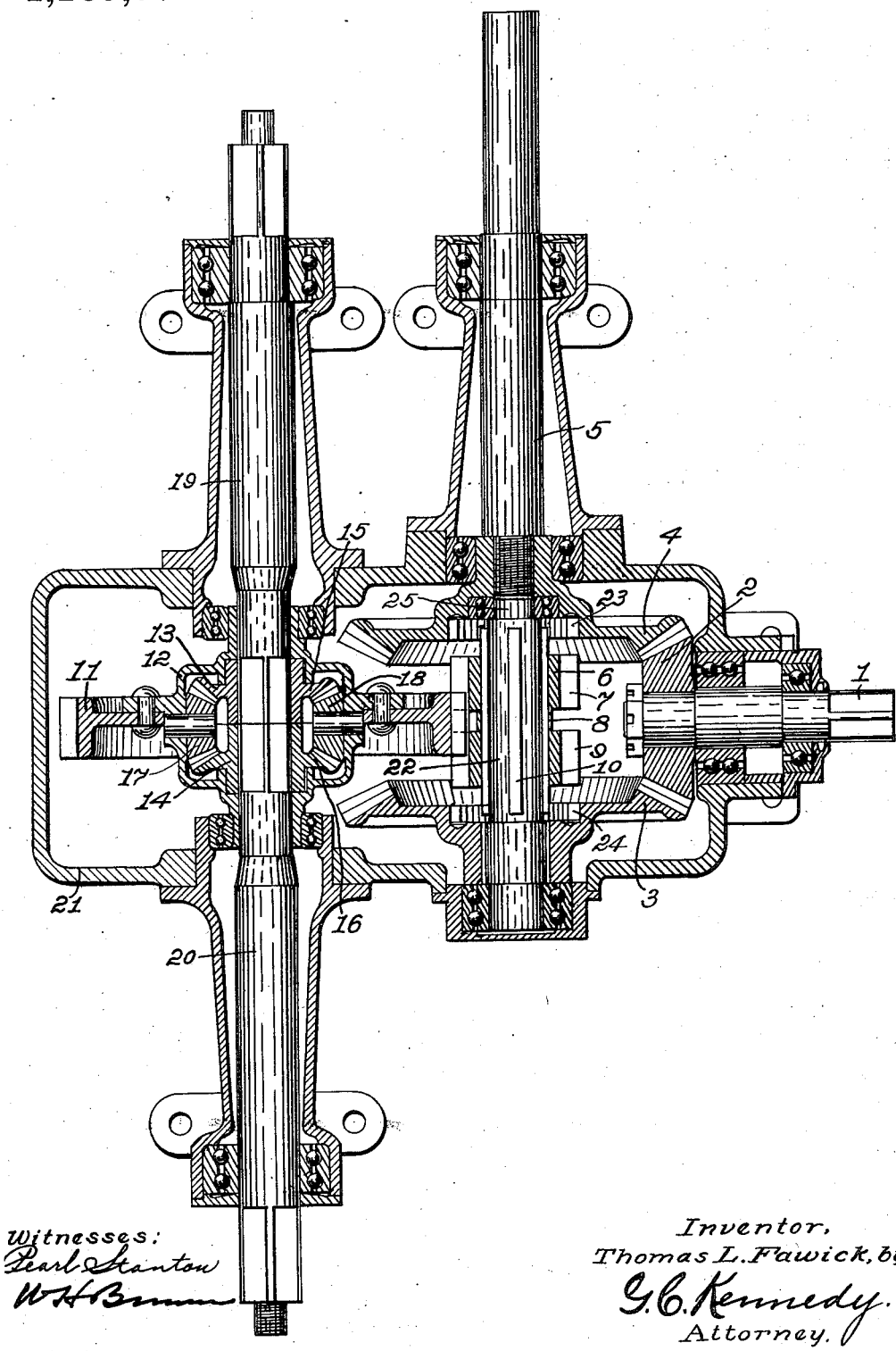
Witnesses:
Pearl Stanton
W. H. Brown
Inventor,
Thomas L. Fawick, by
G. C. Kennedy.
Attorney.

UNITED STATES PATENT OFFICE.

THOMAS L. FAWICK, OF SIOUX FALLS, SOUTH DAKOTA.

POWER-TRANSMISSION DEVICE.

1,169,072.  Specification of Letters Patent.  Patented Jan. 18, 1916.

Application filed January 25, 1915. Serial No. 4,319.

*To all whom it may concern:*

Be it known that I, THOMAS L. FAWICK, a citizen of the United States of America, and a resident of Sioux Falls, Minnehaha county, South Dakota, have invented certain new and useful Improvements in Power-Transmission Devices, of which the following is a specification.

My invention relates to improvements in power transmission devices, and the object of my improvement is to supply for use on a tractor, or the like, a compact mechanism of the kind mentioned which will be efficient in use and adapted to be so inclosed as to keep out dust or other obstructing substances. This object I have accomplished by the mechanism which is hereinafter described and claimed, and which is illustrated in the accompanying drawing, which is a horizontal medial section of the gearing, bearings, and casing of my transmission device, the shafts only not being sectioned.

The compact rectangular casing 21 is provided with anti-friction bearings of a well-known type for the various shafts about to be described. Of these, the power shaft 1, has within the casing a bevel-pinion 2 secured thereon and in mesh, on opposite sides, with like bevel-gear wheels 3 and 4, the gear-wheel 3 being mounted on the shaft 25, and the gear-wheel 4 upon a pulley-shaft 5, the pulley not being shown.

The numeral 22 denotes a part of the shaft 25, located between the bevel gear-wheels 3 and 4, and having splines 10, a gear-wheel 6 being slidably non-rotatably mounted on said splines. The wheel 6 is of the spur-tooth type, and has an annular groove 8 medially cut through its teeth to provide spaced but alined pairs of teeth 7 and 9. Any suitable or well known shifting means, such as the bifurcations of a forked lever not shown, may be inserted in said groove, whereby the wheel 6 may be shifted to and fro along the shaft part 22 as desired, to enmesh the ends of the teeth 7 or 8, alternately with the internal-gear teeth 23 or 24 respectively provided on the said bevel-gears 4 and 3.

The numerals 19 and 20 denote alined shafts on whose outer ends may be mounted the traction-wheels of a tractor or like vehicle, but not here shown. A differential gearing connects the abutting ends of said shaft within said casing, comprising the bevel-gears 13 and 14, mounted on said shafts, and bevel-pinions 17 and 18 mounted on stub-shafts within the hollow hub of a spur-gear wheel 11, said bevel-gears and pinions intermeshing with each other in the usual way, and the spur-gear wheel 11 intermeshing with the gear-wheel 6.

While the gears of the device are in the positions shown, the wheel 6 is idle, as also the differential gear, but the pulley-shaft 5 is rotated. When the wheel 6 is shifted toward the wheel 4 and the ends of its teeth 7 intermeshed with the internal-gear teeth 23 of the wheel 4, the latter rotates the wheels 6 and 11, and by means of the differential gearing, rotates the traction-wheel shafts 19 and 20 in one direction. When the wheel 6 is shifted sufficiently in an opposite direction over the splines 10, the outer ends of its teeth 9 are intermeshed with the internal gear teeth 24 of the bevel-gear 3, and, since the teeth of the wheel 11 are always in mesh with the teeth of said wheel 6, the wheel 11, said differential gearing, and the shafts 19 and 20 are rotated in an opposite direction.

The device occupies but little space, and its casing 21 covers the gearing thereof securely to prevent the intrusion of foreign matters from without.

Having described my invention, what I claim as new, and desire to secure by Letters Patent, is:

1. A power transmission device, comprising a rotatable driving shaft, a bevel-pinion mounted thereon, bevel-gear wheels intermeshing with opposite sides of said pinion, a driven-shaft on which one of said bevel-gear wheels is mounted, a stub-shaft on which the other bevel-gear wheel is mounted and extending therebeyond toward the said driven-shaft in alinement therewith, a pinion slidably and non-rotatably mounted on the stub-shaft, said bevel-gear wheels having like clutch-elements thereon, and the last-mentioned pinion being movable oppositely alternately on the stub-shaft to have the outer ends of its teeth intermeshed with the said clutch elements of said bevel-gear wheels.

2. A power transmission device, comprising a rotatable driving-shaft, a bevel-pinion mounted thereon, bevel-gear wheels intermeshing with opposite sides of said pinion, a driven-shaft on which one of said bevel-gear wheels is mounted, a stub-shaft on which the other bevel-gear wheel is mounted and extending therebeyond toward the said driven-shaft in alinement therewith, a pinion slidably and non-rotatably mounted on the stub-shaft and having an annular groove intersecting its teeth medially and circumferentially and adapted to receive movable shifting-means, said bevel-gear wheels having like clutch-elements thereon, the last-mentioned pinion being movable along the stub-shaft oppositely to intermesh the outer ends of its teeth with the said clutch-elements alternately, and a gear-wheel intermeshed with the teeth of the last-mentioned pinion at all times.

Signed at Waterloo, Iowa, this 6th day of Jan. 1915.

THOMAS L. FAWICK.

Witnesses:
W. H. BRUNN,
GEO. C. KENNEDY.